United States Patent Office 2,786,063
Patented Mar. 19, 1957

2,786,063

EXTRACTION OF SESAME

Richard H. Purdy, Richmond, and John A. Kneeland, Menlo Park, Calif., assignors to Pacific Vegetable Oil Corporation, a corporation of California No Drawing. Application April 23, 1956, Serial No. 579,745

6 Claims. (Cl. 260—340.5)

This invention relates to the extraction of certain components from sesame, utilizing novel extraction solvents. More specifically, the invention relates to the extraction of unsaponifiable materials from sesame oil utilizing as the extraction solvent lower alkylnitriles and preferably acetonitrile or a mixture of such nitriles with water or other solvents.

For some time, it has been known that sesame oil contains a material which is a synergist for certain insecticides such as pyrethrum. However, the use of sesame oil itself is somewhat undesirable inasmuch as sprays made with sesame oil have a definite oily appearance and the inactive components of the oil tend to dilute the mixture. It is known that the effective ingredients of sesame oil, for use as insecticide synergists, are a mixture of unsaponifiable materials of sesame oil such as sesamin, sesamolin and sesamol.

In the past, it has been proposed to extract these materials from sesame oil using solvents such as methyl alcohol and the like. However, such solvents are not fully effective since they also dissolve certain materials from the sesame oil which are not effective synergists.

In accordance with the present invention, we have found that the lower alkylnitriles having from two to four carbon atoms are extremely efficient extraction solvents for sesame oil. We have further found that the effectiveness of the process can be increased by using a mixture of the nitrile and water, since the water tends to prevent the solvent from becoming dissolved in the raffinate. Because of its low cost and effectiveness, we prefer to use acetonitrile.

In the following non-limiting examples, batch processes have been used for the extraction of sesame oil. However, it will be apparent to those skilled in the extraction art that continuous processes, and particularly counter-current continuous processes, can be used in carrying out the extraction. Further, the extraction may be carried out at any temperature from normal room temperature of about 20° C. to elevated temperatures such as 80° C. However, it is normally preferred to work at temperatures of around 65° C., at least for the initial mixing, since it is easier to secure intimate mixing of the materials. The solvent to oil ratio may be varied within wide limits. Thus, one may use from 10 parts of oil to one part of solvent to one part of oil to ten parts of solvent.

The nitriles may be used with other solvents such as water, methanol, ethanol, acetone and the like. Further, the extraction need not be carried out on sesame oil but, instead, the sesame seeds can be ground and extraction carried out on the finely ground solid meal.

*Example 1.*—About 200 pounds of sesame oil and 200 pounds of acetonitrile were placed in a jacketed kettle, heated to a temperature of 65° C., and mixed together for one-half hour. The heat and agitation was then withdrawn, and the mixture was allowed to cool and settle overnight. Two phases were formed, one an upper or extract phase consisting primarily of acetonitrile, and the desired unsaponifiable components, and the other a lower or raffinate phase containing primarily sesame oil with a small amount of solvent therein. The phases were separated and the upper phase was distilled to yield a residue of 3.2 pounds of a brown, semi-solid material which was primarily a mixture of sesamin and sesamolin, and which contained minor amounts of other unsaponifiable materials. This extract contained a total of 52% sesamin and sesamolin, which is a marked improvement over the 10–20% yields obtained by methanol extraction, and represents about a 75% extraction. This material was tested as a synergist for pyrethrum and was found to be more effective when used for this purpose than conventional methanol extracts. The lower phase was stripped with steam to remove the traces of acetonitrile therefrom.

*Example 2.*—The procedure of Example 1 was repeated except that the solvent consisted of 200 pounds of a mixture which contained five parts by weight of acetonitrile and one part by weight water. The procedure was otherwise exactly the same, and again the distillate from the upper phase was found to be much more active than conventional methanol extracts of sesame. The yield of product was reduced to 2.2 pounds in comparison to Example 1, but the percent of sesamin and sesamolin increased to 65.5% of the extract. The use of water resulted in a smaller quantity of the solvent dissolving in the lower phase, so that the lower phase was easier to steam extract.

*Example 3.*—Two-hundred pounds of sesame oil and 100 butyronitrile were intimately mixed at 65° C. for thirty minutes. The heat was stopped and agitation continued for another half hour. After settling overnight, the butyronitrile extract layer was drawn off the top and the oil layer mixed a second time with 100 pounds of butyronitrile under the same conditions. The combined extracts were pumped to a still where the butyronitrile was distilled off, and a brown, semi-solid material containing sesamin, sesamolin, and other unsaponifiables obtained which weighed 4.0 pounds. This product contained 42% combined sesamin-sesamolin.

*Example 4.*—Two-hundred pounds of sesame oil and a solvent consisting of 150 pounds of acetonitrile and 50 pounds of methanol were mixed at room temperature, 24° C., for one hour. After settling overnight, the oil was drawn off the bottom and treated with live steam. The top layer consisting of acetonitrile, methanol, fatty acids, sesamin, sesamolin, and other unsaponifiable material was distilled to yield a brown, semi-liquid extract of 4.6 pounds, which contained about 40% sesamin-sesamolin.

*Example 5.*—Three-hundred pounds of sesame oil and 100 pounds of acetonitrile were mixed thoroughly at 24° C. for one hour. After settling overnight, the bottom layer, sesame oil, was drawn off, and steam stripped to remove the residual solvent. The top layer, acetonitrile and extract, was distilled to yield a brown, semisolid material, weighing 2.9 pounds, and containing 63.6% sesamin-sesamolin. This latter method offers economy of processing and a fairly concentrated extract.

We claim:

1. A process for the extraction of sesame to recover unsaponifiable materials therefrom comprising mixing an alkylnitrile having from two to four carbon atoms with a member selected from the group consisting of sesame seed and sesame oil, allowing two phases to form, one an upper phase containing primarily the nitrile and unsaponifiable materials, and the other a lower phase, separating the two phases and then separating the nitrile from the upper phase whereby there is left a concentrate of unsaponifiable materials from the sesame.

2. The process of claim 1 wherein the sesame containing material is sesame oil.

3. The process of claim 1 wherein the nitrile is acetonitrile.

4. The process of claim 1 wherein the nitrile contains water.

5. The process of claim 1 wherein the extraction is conducted at a temperature of 20–80° C.

6. The process of claim 1 wherein about equal parts of sesame oil and nitrile are employed.

No references cited.